A. PONS.
FIBER CLEANING MACHINE.
APPLICATION FILED MAR. 3, 1913. RENEWED JULY 26, 1917.

1,255,633.

Patented Feb. 5, 1918.
6 SHEETS—SHEET 1.

A. PONS.
FIBER CLEANING MACHINE.
APPLICATION FILED MAR. 3, 1913. RENEWED JULY 26, 1917.

1,255,633.

Patented Feb. 5, 1918.
6 SHEETS—SHEET 5.

A. PONS.
FIBER CLEANING MACHINE.
APPLICATION FILED MAR. 3, 1913. RENEWED JULY 26, 1917.

1,255,633.

Patented Feb. 5, 1918.
6 SHEETS—SHEET 6.

WITNESSES

INVENTOR
Angel Pons
BY
J. W. Ellis
ATTORNEY

UNITED STATES PATENT OFFICE.

ANGEL PONS, OF BUFFALO, NEW YORK.

FIBER-CLEANING MACHINE.

1,255,633. Specification of Letters Patent. Patented Feb. 5, 1918.

Application filed March 3, 1913, Serial No. 751,874. Renewed July 26, 1917. Serial No. 183,022.

*To all whom it may concern:*

Be it known that I, ANGEL PONS, a subject of the King of Spain, residing in the city of Buffalo, county of Erie, and State of New York, have invented certain new and useful Improvements in Fiber-Cleaning Machines, of which the following is a full, clear, and exact description.

My invention relates to machines for cleaning fibers of plants and more particularly for removing the fleshy and pulpy parts of leaves (such as American aloe) from the ribs and fibers thereof.

The general object of my invention has been to simplify and improve the construction of fiber cleaning machines. Other objects have been to provide for direct feeding of the leaves to the carrier wheels in such a manner that the leaves will be fed parallel to the axes of the rolls; to provide knives for the cleaning wheels which may be accurately and delicately adjusted; to provide a cleaning machine having scraper plates which may be reversed in position.

Reference is to be had to the accompanying drawings forming part of this specification in which like characters of reference indicate like parts throughout the several views. For clearness of illustration in the drawings I have shown many of the sprocket wheel gears and sprocket chains in a conventional manner only. In the drawings.

In the drawings 15 represents the bed plate of my machine which carries the supporting bearings and other parts of the device. 16 are standards which support the feed mechanism and which are suitably secured to the bed plate 15. 17 and 18 are corrugated feed rollers which are mounted in suitable bearings supported by the standards 16. Adjacent to the rollers 17 and 18 are smooth feed rollers 19 and 20 which are also mounted in suitable bearings supported by the standards 16. Rollers 17 and 19 are each yieldably carried by the bearings 21, (see Figs. 8 and 9) so that they may have a vertical movement against resistance and thus accommodate themselves to leaves having varying thicknesses.

Figure 8:
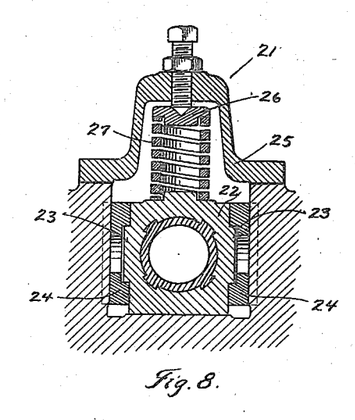
Fig. 8 is a transverse sectional view of one of the roller shaft bearings.
Figure 9:
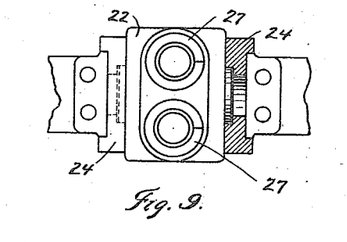
Fig. 9 is a plan view of the same with the cap removed and showing one of the bearing slides in section.

Referring now to Figs. 8 and 9 which show the bearing 21 of the feed roller 17 and 19, 22 represents the bearing block which is preferably provided with a suitable bushing of anti-friction metal as shown. This bearing block is provided on two of its opposite sides with cylindrical lugs 23. These lugs are pivotally carried in bearing slides 24, whereby the roller 17 or 19 may assume an angular position with its coöperating roller without binding in the bearings. The slides 24 are each vertically slidable in suitable ways formed in the housing of the bearing. A cap 25 is secured to the housing of each bearing and between the washers 26, and each of the bearing blocks 22 are disposed helical springs 27. The washers 26 are adjustably held in position against the springs 27 by set screws carried by the caps.

Carried at some distance from the feeding end of the machine is a plurality of sheaves 28 which are mounted in suitable bearings carried by the standard 29. Connecting the sheaves 28 with the feed roller 20 are a plurality of feed chains 30. These feed chains fit in annular grooves provided in the periphery of the roller 20 so as to be beneath the outer surface thereof. Idlers 31 are provided which keep the upper stretch of the feed chains 30 at a proper elevation. A plurality of guide chains 32 fit in annular grooves formed in the periphery of the upper feed roller 19 and pass over sheaves 33 rotatably carried by an extension of the standards 16. The corrugated feed rollers 17 and 18 are each provided with annular grooves in their peripheries for the accommodation of the guide chains 30 and the feed chains 32, respectively.

Figure 4:
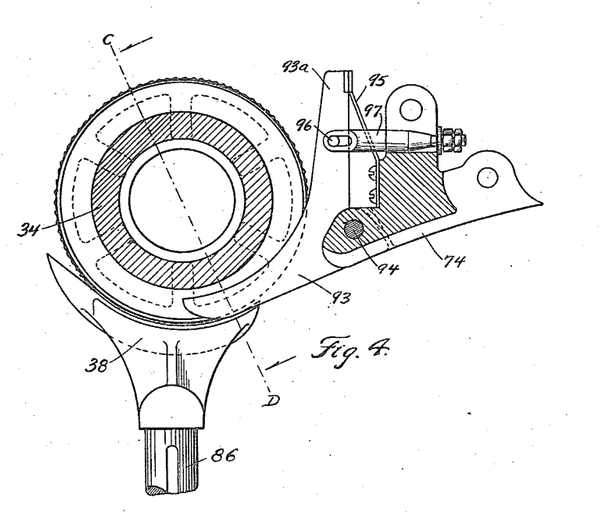
Fig. 4 is a sectional elevation of the inner feed roller showing one of the shoes in position, and also one of the spring fingers in position.
Figure 5:
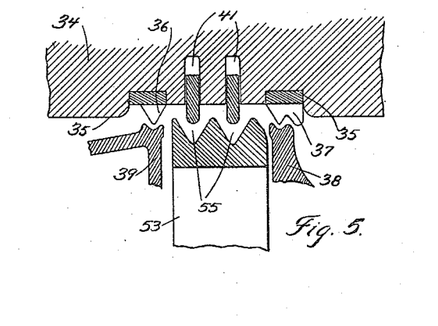
Fig. 5 is a sectional view of the parts shown in Fig. 4 and is taken on line C—D thereof.

An inner feed roller 34 is carried by the standard 16 and rotatably disposed in a pair of the yieldable bearings, shown in Figs. 8 and 9, and hereinbefore described. This inner feed roll is provided with two annular grooves 35 (Fig. 5). In one of the grooves 35 is suitably secured a single toothed ring 36 and in the other groove is suitably secured a double toothed ring 37. 38 and 39 are shoes which are disposed directly beneath the toothed rings 36 and 37. The upper surface of each of these shoes is provided with a V shaped groove which is substantially concentric with the outer circumference of said toothed rings (Figs. 4 and 5). The grooved face of each of the shoes at its front end is slightly curved away from the periphery of the toothed rings thus forming a wedge shaped space between it and the toothed ring. These shoes are yieldably supported by helical springs 40 suitably carried by the frame work of the machine. The toothed rings 36 and 37 are so arranged that they straddle the first carrier wheel 53, and the inner feed roller 34 is provided between the toothed rings with two narrow annular grooves 41 in which are engageable the spring pressed fingers 93 hereinafter described.

42 (Fig. 2) is the main drive shaft which is rotatably mounted in suitable bearings carried by the housing of the machine and has at its outer end a tight pulley 43 and a loose pulley 44 by which power is conveyed to the shaft. A bevel gear pinion 45 is secured on the shaft 42 and this pinion engages with a large bevel gear 46 which is rigidly secured to the smooth feed roller 20 and thus serves to drive the same. The upper feed roller 19 is driven from the shaft of the lower feed roller 20 by means of spur gears 47. The inner feed roller 34 is driven by means of a spur gear 48 carried by its shaft. This gear 48 meshes with one of the spur gears 47. The corrugated rollers 17 and 18 are rotatably connected together by a pair of spur gears 49 and connecting the shaft of the lower roller 18 with the smooth roller 20 is a chain 50 which runs over suitable sprocket wheels 51 and 52 carried by the rollers 18 and 20 respectively.

Figure 1:
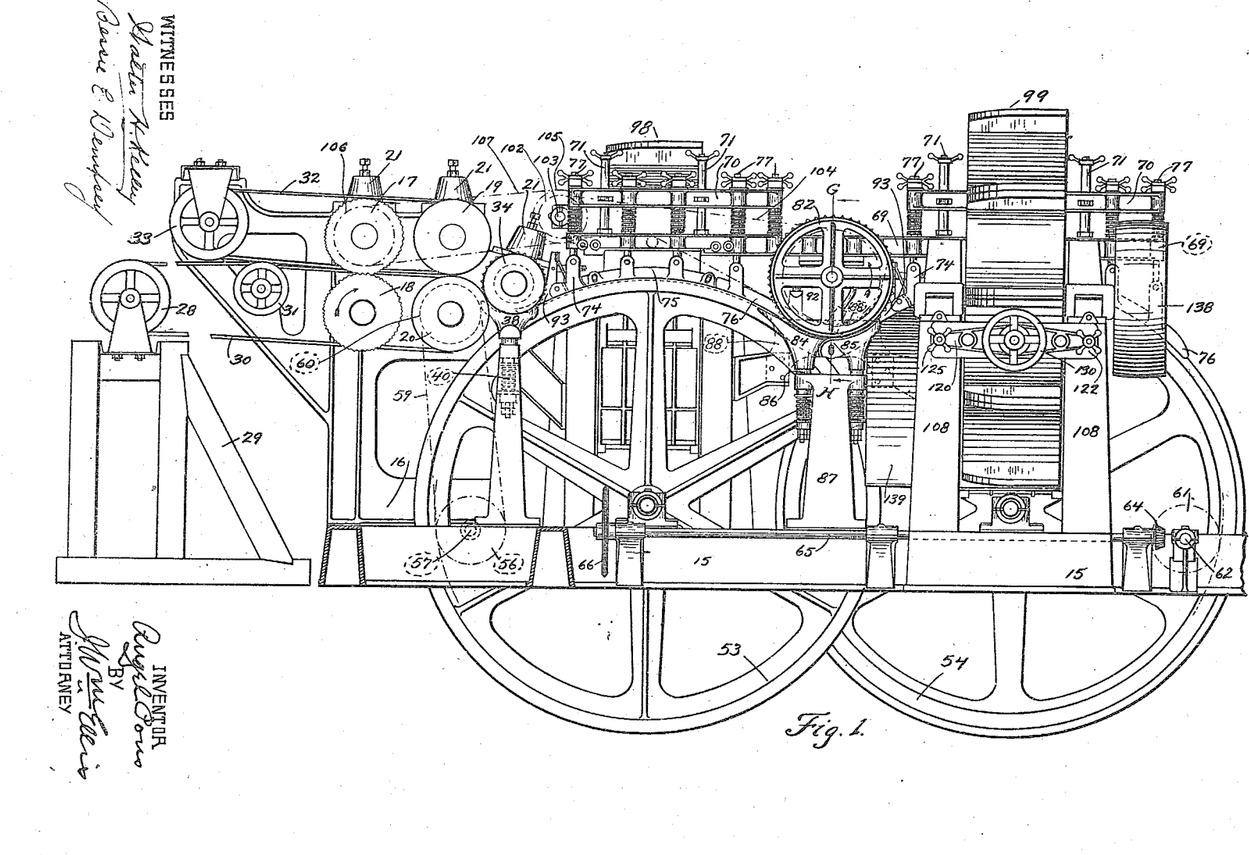
Figure 1. is a side elevation of the machine with a portion of the bed plate broken away and also a part of the feed chains removed.
Figure 2:
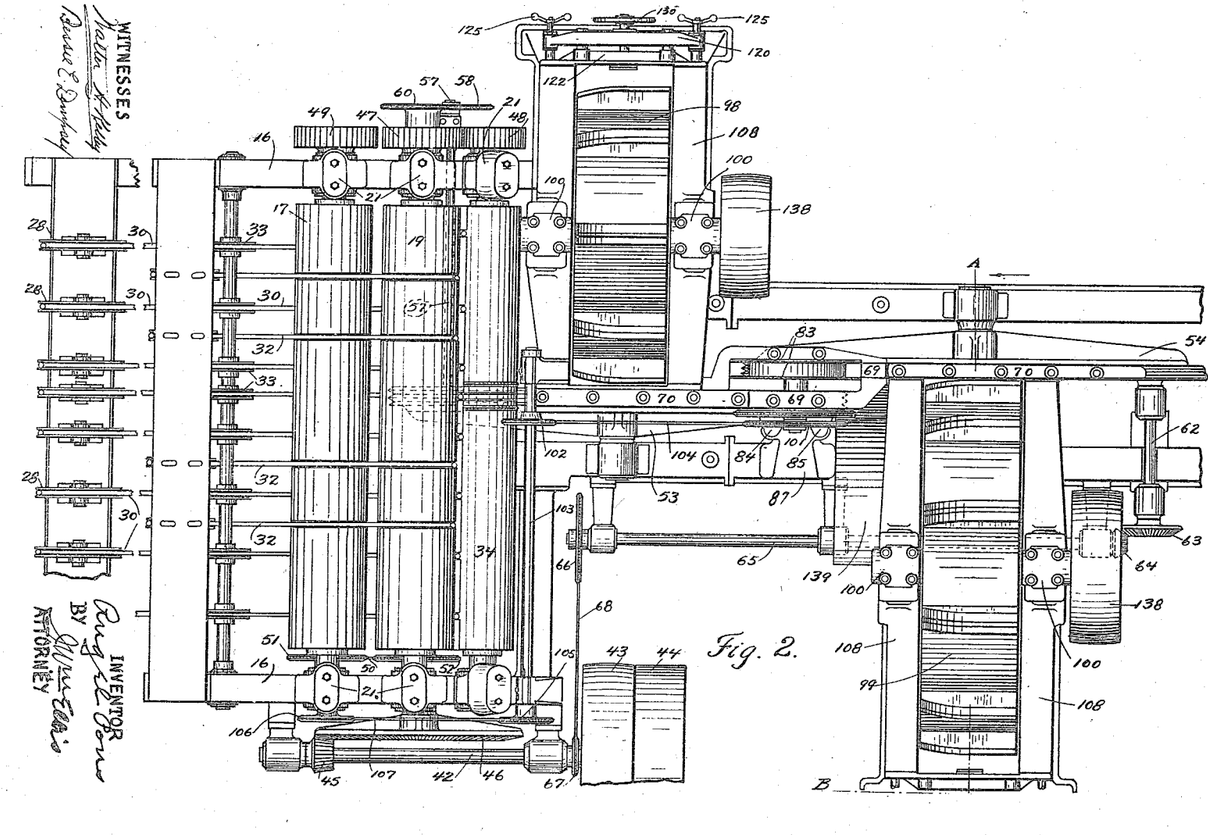
Fig. 2. is a plan view of the machine.
Figure 3:
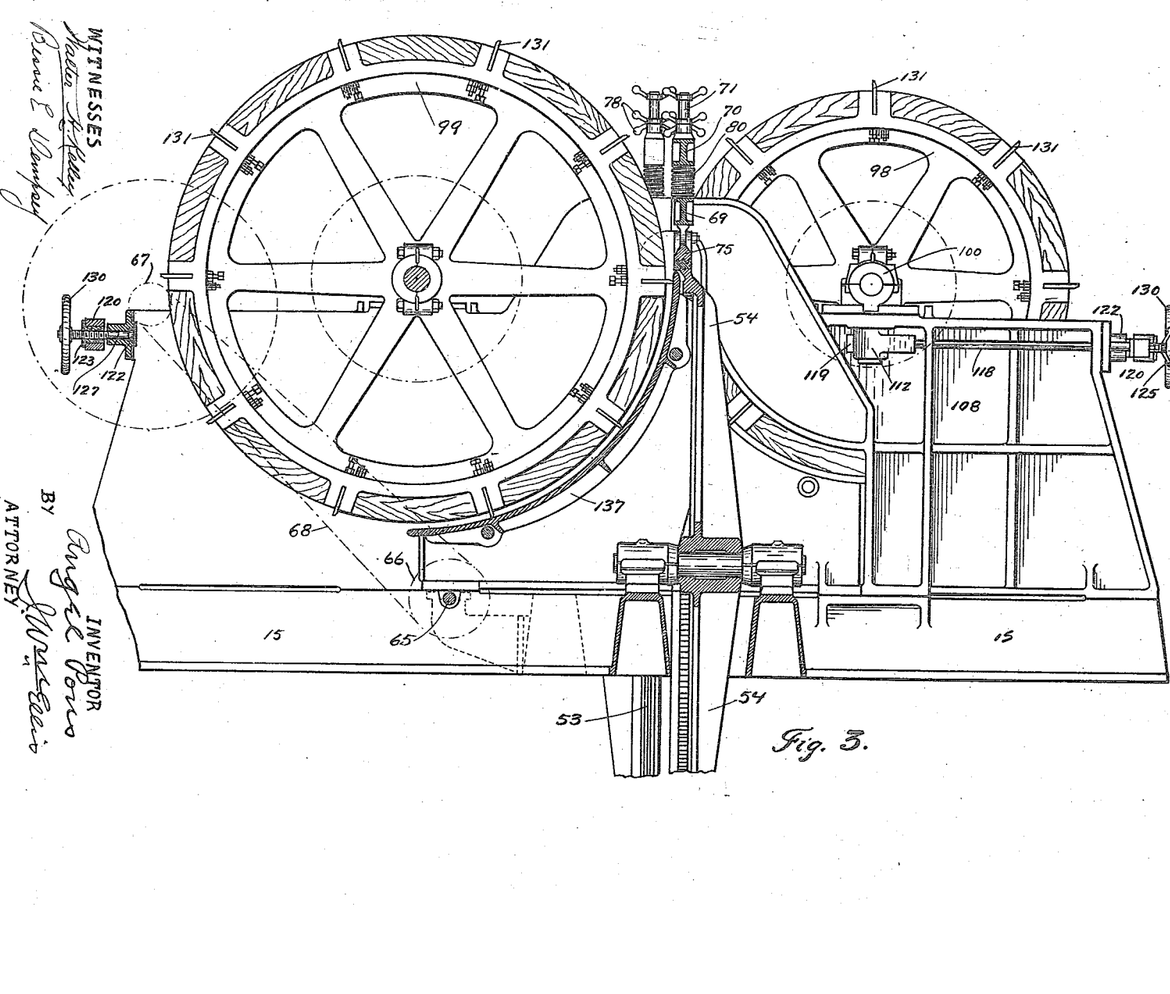
Fig. 3. is an end elevation of the machine partly in section, the section thereof being taken on line A—B of Fig. 2.
Figure 7:
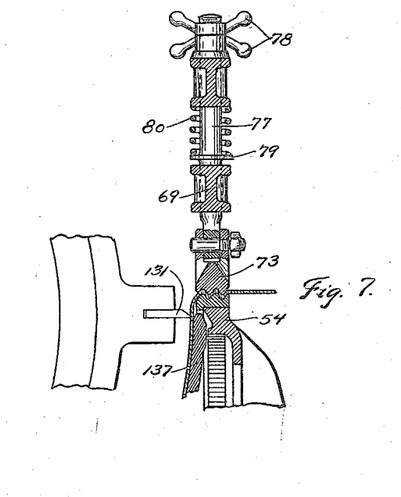
Fig. 7 is an enlarged sectional elevation of a portion of my device taken on line E—F of Fig. 6.

53 and 54 are the carrier wheels of my machine which are rotatably carried in suitable bearings supported by the bed plate of the machine, and are so disposed that they overlap one another as shown in Fig. 1. Each of these wheels is provided on its periphery with V-shaped grooves, 55 (as shown in Figs. 3, 5, and 7). Each of these wheels is provided with internal gear teeth near its periphery. The internal gear teeth formed on the carrier wheel 53 mesh with a pinion 56 which is rigidly carried by the shaft 57. The shaft 57 is carried in suitable bearings, and extends to the rear side of the machine. 58 is a sprocket wheel which is secured to the outer end of the shaft 57 and which is connected by means of a suitable sprocket chain 59 to a sprocket wheel 60 carried on a shaft of the feed roller 20 (Figs. 1 and 2).

61 is a gear pinion which meshes with the internal gear teeth on the carrier wheel 54. This pinion is carried by a shaft 62 which has secured on its outer end a bevel gear 63. A bevel gear pinion 64 meshes with the bevel gear 63 and is carried at the outer end of shaft 65. This shaft is rotatably carried in suitable bearings, and has secured at its inner end a sprocket wheel 66. 67 is a sprocket wheel which is rigidly carried by the main drive shaft 42 and connecting the sprocket wheel 67 with the sprocket wheel 66 on the shaft 65 is sprocket chain 68.

69 is a supporting bar (Figs. 1 and 6) which is rigidly carried by the frame work of the machine and so shaped as to lie directly over the carrier wheels 53 and 54. Carried above each end of the supporting bar 69 is a spring bar 70. These spring bars are adjustably supported above the supporting bar 69 by means of the adjusting screws 71. These screws are screw threaded into the bar 69 and each of them has a rigid collar 72 which is disposed within a slot formed in the spring bar 70. By means of these adjusting screws the height of the spring bar 70 may be altered as required.

Figure 6:
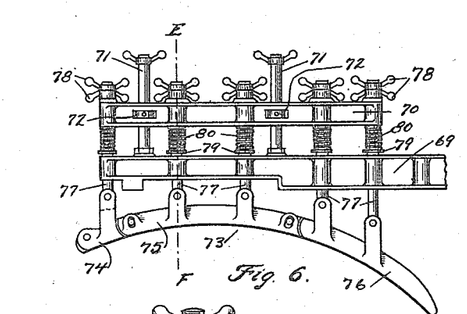
Fig. 6 is a side elevation of the shoes for one of the carrier wheels with the spring tension and adjusting means.

Each of the carrier wheels 53 and 54 is provided with shoes 73. Each of these shoes comprises sections 74, 75 and 76. These sections are pivotally connected together and are so arranged that one section may have a slight vertical movement independent of the other. 77 are rods which are pivotally united at their lower ends to the shoe sections 74, 75 and 76. These rods pass up through apertures provided in the supporting bar 69 and also up through apertures formed in spring bars 70. These rods are screw threaded at their upper ends and are provided with screw thumb nuts 78 by which they may be raised and lowered and locked in place. Each of the rods 77 is provided with a rigid collar 79 which is disposed preferably directly above the supporting bar 69. 80 are helical springs which are disposed between the lower surface of the spring bars 70 and the collars 79. (Figs. 6 and 7.) These springs serve to press the shoe sections 74, 75, and 76 against the leaf being treated and thus securely hold it in contact with the carrier wheels. By means of the thumb nuts 78 the pressure upon the leaf may be regulated and by means of the adjusting screws 71 the space between the shoes and the carrier wheels may be regulated.

Figures 10, 11:
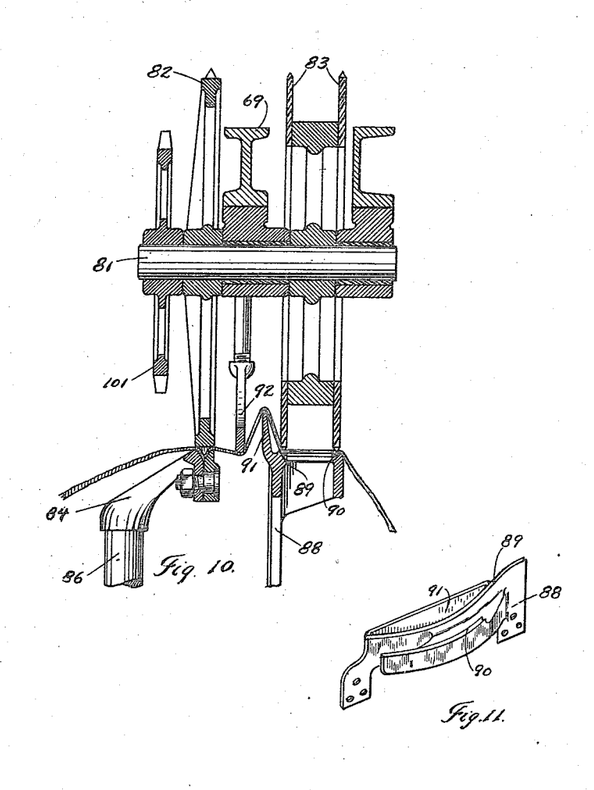
Fig. 10 is a sectional elevation of the transfer device of my machine and is taken on line G—H of Fig. 1.
Fig. 11 is a perspective view of the stationary transfer shoe.

Disposed above and between the two carrier wheels 53 and 54 is the transfer device of my machine (see Figs. 1 and 10). In this transfer device 81 is the main shaft which is rotatably disposed in suitable bearings carried by the supporting bar 69 and other parts of the housing of the machine. Rigidly carried by this shaft and disposed just outside of the grooved periphery of the first carrier wheel 53 is a toothed wheel 82. Two toothed disks 83 are also rigidly carried on the shaft 81, and these disks are so arranged that they straddle the second carrier wheel 54. (Fig. 2). 84 and 85 are shoes which are disposed directly beneath the toothed transfer wheel 82. Each of these shoes is provided with a downwardly extending stud 86 which is vertically slidable but non-rotatably mounted in the standard 87, carried by the frame of the machine. Each of the studs 86 are provided at their lower ends with spring tension means, whereby the shoes are yieldably held in position. The shoes 84 and 85 are connected together at their inner ends in such a manner that each may have a slight vertical movement independent of the other. These shoes are provided in their upper faces with a V shaped groove, and they are so shaped as to be substantially concentric with the toothed transfer wheel 82, except the forward end of the shoe 84 which is curved outwardly and away from the transfer wheel and substantially concentric with the outer periphery of the carrier wheel 53. Carried by the housing of the machine and disposed beneath the transfer disks 83 is a stationary shoe 88 (Figs. 10 and 11). This shoe has two grooved portions 89 and 90 which are arranged to register with the toothed peripheries of the transfer disks 83. These grooved portions are formed throughout their length so as to be substantially concentric with the transfer disks 83, except the forward end of the grooved portion 89 which is curved outwardly and away from its engaging transfer disk and substantially concentric with the periphery of the carrier wheel 53. Adjacent to the grooved portion 89 of the stationary shoe, is provided a straight rim portion 91, over which the partly cleaned leaf is drawn as it is transferred from one carrier wheel to the other.

92 (Figs. 1 and 10) is a guide which is suitably carried by the frame work of the machine and is suspended between the toothed transfer wheel 82 and one of the toothed transfer disks 83. The lower surface of this guide is so shaped as to be substantially concentric with the transfer wheels, and is disposed some distance below the upper surface of the straight rim portion 91 of the stationary shoe 88, whereby the partially treated leaf is drawn down over the straight rim portion 91 so as to shift the leaf to the proper position as it approaches the second carrier wheel, hereinafter more clearly described.

The transfer device is provided with a sprocket wheel 101 which is secured to the shaft 81. This sprocket wheel is connected to the sprocket wheel 102, carried by the shaft 103 (Figs. 1 and 2), by means of a sprocket chain 104. The shaft 103 which is suitably carried by the frame work of the machine has secured on its outer end a sprocket wheel 105. This sprocket wheel 105 is connected with a sprocket wheel 106, secured to the outer end of the upper corrugated feed roller 17 by means of a sprocket chain 107.

Pivotally carried at the forward end of each of the shoe sections 74 are spring pressed fingers 93. These fingers are united to each shoe sections by means of the pin 94 and each is provided with an upwardly extending arm $93^a$ which bears against a spring 95, suitably carried by the shoe section 74. A pin 96 passes through the upwardly extending arm $93^a$ and engages with the slotted outer end of the stud 97. This stud extends inwardly and is adjustably secured in the slot provided in the shoe section 74. By adjusting this stud the extreme outward movement of the arm may be controlled. The inner end of each of the fingers carried by the shoe section over the first carrier wheel is engageable with the narrow annular grooves 41 of the feed roller 34 as clearly shown in Figs. 4 and 5. The fingers which are carried by the shoe section 74 over the second carrier wheel are arranged to extend in between the transfer disks 83 of the transfer device. By means of these fingers the leaf being treated is stripped from the feed roller 34 and transfer device and guided under the forward end of the shoe sections 74 and over the carrier wheels 53 and 54. 139 is a curved plate which is secured to the housing of the machine between the transfer device and the second cleaning wheel 99, whereby the partially cleaned leaves are guided onto the scraper plate of said cleaning wheel.

Figures 12, 13, 14, 15:
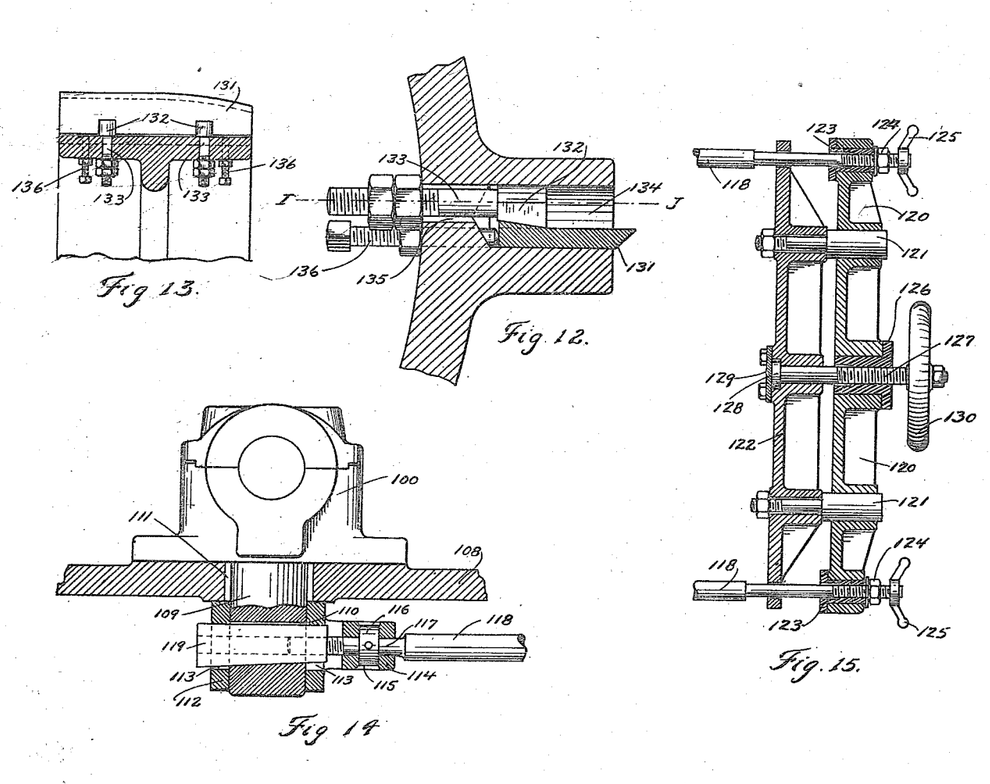
Fig. 12 is a sectional view of one of the cleaning knives and the means for adjusting and clamping the same.
Fig. 13 is a sectional elevation through the rim of one of the cleaning wheels and is taken on line I—J of Fig. 11.
Fig. 14 is a side elevation of one of the cleaning wheel bearings and shows a portion of its adjusting and clamping means.
Fig. 15 is a sectional plan view of the cleaning wheel adjusting means.

98 and 99 are cleaning wheels which are arranged in a plane at right angles to the plane of the carrier wheels 53 and 54, respectively. These wheels are so disposed that a line passing through the center of the face of the wheel will coincide with the axis of the carrier wheel. Each of the cleaning wheels is rotatably mounted in suitable bearings 100. These bearings, as shown in Fig. 14 are slidable upon the upper surface of cleaning wheel housings 108 and each of them has a downwardly extending lug 109 which is provided near its lower end with a transverse slot 110. The lug 109 is movable in a slot 111 provided in the housing 108 and has loosely disposed over its lower end a cage 112. This cage is provided with diametrically disposed slots 113 which register with the slot 110 formed in the lug. The cage 112 is provided with an outwardly extending bearing member 114, which is provided with a slot or recess 115 for the reception of a collar 116, rigidly secured to the end 117 of the adjusting rod 118 whereby the said rod is prevented from moving longitudinally in the cage 112.

The inner end of the portion 117 of the adjusting rod is screw threaded and is adapted to engage with a screw-threaded aperture formed in the smaller end of the wedge-shaped key 119 which is disposed in the slots formed in the lug 109 and the cage 112. When the adjusting rod 118 is rotated the key 119 will be moved in or out, and thus either lock or loosen the bearing 100 (Fig. 14).

In Fig. 15 I have shown means whereby the cleaning wheels may be adjusted with relation to their scraper plates, and the carrier wheels. In this figure, 120 is a traverse which extends across the outer face of the wheel housings 108 and is slidably mounted upon studs 121, suitably carried by a plate 122 secured to the front end of the housing. The outer ends of the adjusting rods 118 pass through apertures formed in the plate 122, and also screw-threaded bushings 123 rotatably carried at the ends of the traverse 120. These bushings are each provided with a collar which bears against the inner face of the traverse and each of them is locked in place upon the rods by means of lock nuts 124, also screw-threaded upon the rods. Handles 125 are secured at the extreme outer end of the adjusting rods 118, whereby they may be slightly rotated. The bushings 123 and adjacent parts provide means whereby one of the cleaning wheel bearings may be moved in or out independent of the other bearing, thus allowing a perfect alinement of the cleaner wheel with respect to its scraper plate, and the carrier wheel. When it is desired to so adjust the wheel one of the lock nuts 124 is released and the bushing 123 slightly rotated thus increasing or decreasing the distance between the traverse and the bearing being adjusted. By means of the handle 125, the shaft is held against rotation while this adjustment is being made. After the bearings have been adjusted as above described the lock nut 124 is again moved up against the bushing thus securely locking it in its adjusted position. The bushings 123 being rotatably mounted in the traverse, the rods 118 may be rotated by means of the handles 125. When the handles are rotated the wedge-shaped key 119 is moved inwardly or outwardly thus loosening or locking the bearing 100 as the case may be. Passing through the center of the traverse 120 is a screw threaded bushing 126 which is suitably secured in the traverse against rotation. Passing through a central screw threaded aperture formed in the bushing 126 is a screw threaded stud 127. This stud is provided with a head 128 at its inner end which is disposed in a recess formed in the inner side of the plate 122. A disk 129 is secured to the plate 122 over the said recess and serves to retain the screw threaded stud in place and prevent it from moving longitudinally. At the outer end of the stud 127 is rigidly secured a hand wheel 130 by which the stud may be rotated. It will thus be seen that when the stud is rotated the traverse 120 will be moved in or out and thus adjust the position of the cleaning wheel. The traverse 120, being slidably carried by the studs 121, will retain its right angle position with respect to the rods 118 throughout its travel. Each of the cleaning wheels 98 and 99 are provided with a plurality of suitable knives 131 as clearly shown in Figs. 12 and 13. These knives are set into transverse grooves around the periphery of each wheel and each has formed on one side near the inner end a wedge shaped surface (Fig. 12). 132 are locking wedges which are formed on the outer end of the studs 133. These wedges are disposed in apertures 134 formed in the periphery of the cleaning wheel and adjacent to the slots in which the knives are disposed. Apertures 135 extend from the apertures 134 and pass through the rim of the wheel. In apertures 135 are disposed the studs 133, which are locked in place by means of the lock nuts shown. Screw threaded through the rim of the wheel are set screws 136 which are disposed directly beneath the knives 131, and each is provided with a suitable lock nut as shown whereby the knife may be accurately and delicately adjusted. Each knife is provided with two locking wedges, and two set screws, and after the knives have been adjusted by means of the set screws they are securely locked in place by tightening the lock nuts on the studs 133. In Fig. 3 I have shown wooden blocks secured to the outer periphery of the cleaning wheels which serve to fill in the space between the lugs in which the knife slots are formed. These blocks for convenience of illustration have been omitted in the other figures of the drawing.

Each of the cleaning wheels is provided with a scraper plate 137 (Figs. 3 and 7). These plates are curved on their inner surfaces so as to be concentric with the arc formed by the rotating knives of each cleaning wheel and each is secured to the housing of the machine in such a manner that they may be removed and reversed in position, it being well known by those skilled in the art that the upper ends of these scraper plates wear more rapidly than the lower ends do. The upper ends of these plates are so arranged that they lie directly beneath the overhanging rim of the carrier wheels as clearly shown in Figs. 3 and 7 whereby the leaf being treated will be carried over the surface of the scraper plates by means of the carrier wheels. Each of the cleaning wheels is provided with a belt pulley 138 whereby the same may be rotated.

The operation of the machine is as follows:

The leaf to be treated is placed upon the feed chains 30 at the forward end of the machine with the butt end toward the first cleaning wheel. The leaf is carried in toward the machine and between the feed chains 30 and guide chains 32 and passes between the corrugated rollers 17 and 18 and the smooth rollers 19 and 20 whereby the leaves will be gripped and fed parallel to the inner feed roller 34, and thus be prevented from being twisted or moved out of the path of the feed roller. The corrugated rollers 17 and 18 are slightly separated and serve to crush the butt end of the leaf. After the leaf passes the rollers 17 and 18 it is flattened by its passage between the smooth rollers 19 and 20 and is afterward crushed by the feed roller 34. As the leaf approaches the feed roller 34 it is gripped by the toothed annular rings 36 and 37 and carried between the said roller and its shoes 38 and 39 and from thence under the forward end of the shoe section 74 disposed over the first carrier wheel.

As the leaf is passing from the feed roller to the first carrier wheel it is stripped from engagement with the toothed rings on the feed rollers by the spring pressed fingers 93 carried by the forward end of the shoe section 74. The first carrier wheel is located near the center of the feed roller so that the leaf as it passes beneath the shoes and the first carrier wheel is gripped thereby at substantially its center. The leaf, being gripped between the grooves forming the periphery of the first carrier wheel and the sectional shoes 74, 75 and 76, is carried forwardly by the carrier wheel and one-half thereof passes over the scraper plate of the cleaning wheel 98 where it is treated and the fleshy or pulpy parts of the leaves removed.

The leaf is now carried around to the transfer device and the uncleaned portion thereof is engaged by the teeth of the transfer wheel 82 and gripped between it and the shoes 84 and 85. As the leaf is being moved along by the rotation of the transfer wheel 82 it is drawn over the straight rim portion of the stationary shoe 88 and beneath the guide 92, thus the cleaned portion of the leaf is drawn up toward the transfer device, and as it continues to move along, the cleaned portion is gripped between the toothed transfer disks 83 and the stationary shoe 88. As the leaf continues to move along it will be engaged by the spring pressed fingers 93 at the forward end of the shoe section 74 over the second carrier wheel and guided between the shoe and the carrier wheel, while the uncleaned portion of the leaf is being released from its grip by the transfer wheel 82 and shoes 84 and 85. As will be clearly seen by reference to Figs. 1 and 10 when the uncleaned portion of the leaf is released it will fall on the plate 139, and take up the slack formed by the passage of the cleaned part of the leaf over the rim 91 of the stationary shoe 88 and under the guide 92, thus shifting the position of the leaf. In this position the uncleaned part will be carried by the second carrier wheel over the scraper plate of the cleaning wheel 99 and be cleaned by said cleaning wheel. The entire leaf will thus be treated. It will be clearly seen that the leaf throughout its travel in the machine is held by yieldable means so that leaves of varying thicknesses may be accommodated without increasing or adding undue friction to the working parts of the machine.

Obviously modifications may be made of the details herein shown and described, without departing from the spirit of my invention or the scope of the appended claims, and I do not wish to be limited to the exact embodiment herein shown and described.

Having described my invention what I claim is:

1. In a fiber cleaning machine, the combination with movable carrier means and cleaning means adjacent to said carrier means, of an inner feed roller having its periphery in close proximity to the surface of said carrier means, a pair of smooth feed rollers adjacent to said inner feed rollers, a plurality of feed chains and a plurality of guide chains passing between said smooth rollers, whereby the leaves being treated will be conveyed to said feed rollers and said carrier means.

2. In a fiber cleaning machine, the combination with movable carrier means and cleaning means adjacent to said carrier means, of an inner feed roller having its periphery in close proximity to the surface of said carrier means, gripping means carried by said inner feed roller and shoes disposed beneath said gripping means, whereby the leaves being treated will be gripped and conveyed to said carrier means.

3. In a fiber cleaning machine, the combination with movable carrier means and cleaning means adjacent to said carrier means, of an inner feed roller having its periphery in close proximity to the surface of said carrier means, means for yieldably mounting said inner feed roller, gripping means carried by said feed roller, and yieldably supported shoes disposed beneath said gripping means, whereby the leaves being treated will be gripped and conveyed to said carrier means.

4. In a fiber cleaning machine, the combination with movable carrier means and cleaning means adjacent to said carrier means, of an inner feed roller having its periphery in close proximity to the surface of said carrier means, gripping means carried by said inner feed roller and spring pressed stripper means disposed between said gripping means, whereby the leaves being treated will be stripped from said inner feed roller as they are conveyed to said carrier means.

5. In a fiber cleaning machine, the combination with movable carrier means and cleaning means adjacent to said carrier means, of a plurality of shoe sections flexibly connected together and disposed above said carrier means, spring tension means for pressing said shoe sections toward said carrier means and screw adjusting means for controlling the position of the said shoe sections.

6. In a fiber cleaning machine, the combination with movable carrier means and cleaning means adjacent to said carrier means, of a rigid supporting bar disposed above said carrier means, a spring bar carried above said supporting bar, shoe sections flexibly connected together and disposed above said carrier means, spring tension means engageable with said spring bar for pressing said shoe sections toward said carrier means, and screw adjusting means carried by said supporting bar and spring bar, whereby the distance between the shoe sections and the carrier means may be regulated.

7. In a fiber cleaning machine, the combination with two carrier wheels, cleaning means adjacent to each carrier wheel and a supporting bar disposed over said carrier wheels, of a transfer device carried by said supporting bar, comprising gripping means disposed near the outer face of the first carrier wheel, gripping means straddling the second carrier wheel and shoes disposed beneath said gripping means whereby the leaves being treated are gripped and transferred from the first carrier wheel to the second carrier wheel.

8. In a fiber cleaning machine, the combination with two carrier wheels, cleaning means adjacent to each carrier wheel and a supporting bar disposed over said carrier wheels, of a transfer device carried by said supporting bar and disposed between and in line with said carrier wheels, said transfer device, comprising a toothed wheel disposed near the outer face of the first carrier wheel, two toothed disks straddling the second carrier wheel and shoes disposed beneath said toothed wheel and disks, whereby the leaves being treated are gripped and transferred from the first carrier wheel to second carrier wheel.

9. In a fiber cleaning machine the combination with two overlapping carrier wheels, cleaning means adjacent to each carrier wheel and a supporting bar disposed over said carrier wheels, of a transfer device carried by said supporting bar and disposed over said carrier wheels and comprising a toothed wheel and two toothed disks adjacent to said toothed wheel and yieldably mounted shoe sections disposed beneath said toothed wheel, said sections being pivotally connected together in such a manner that each may have a slight vertical movement independent of the connected section, and a stationary shoe disposed beneath said toothed disks, whereby the leaf being treated is transferred from one carrier wheel to the other carrier wheel.

10. In a fiber cleaning machine the combination with two overlapping carrier wheels, cleaning means adjacent to each carrier wheel and a supporting bar disposed over said carrier wheels, of a transfer device carried by said supporting bar and disposed over said carrier wheels and comprising a toothed wheel and two toothed disks adjacent to said toothed wheel and yieldably mounted shoe sections disposed beneath said toothed wheel, said sections being pivotally connected together in such a manner that each may have a slight vertical movement independent of the connected section, a stationary shoe disposed beneath said toothed disks, and a guide suspended from said supporting bar and disposed between said shoes, whereby the leaf being treated is transferred from one carrier wheel to the other carrier wheel.

11. In a fiber cleaning machine the combination with two overlapping carrier wheels, cleaning means adjacent to each carrier wheel and a supporting bar disposed over said carrier wheels, of a transfer device carried by said supporting bar and disposed over said carrier wheels, and comprising a toothed wheel and two toothed disks adjacent to said toothed wheel, yieldably mounted shoe sections disposed beneath said toothed wheel, and means disposed beneath and adjacent to said toothed disks for shifting the position of the leaf being treated as it passes from the first carrier wheel to the second carrier wheel, whereby the entire leaf is treated.

12. In a fiber cleaning machine the combination with two overlapping carrier wheels, cleaning means adjacent to each carrier wheel and a supporting bar disposed over said carrier wheels, of a transfer device carried by said supporting bar and disposed over said carrier wheels, and comprising a toothed wheel and two toothed disks adjacent to said toothed wheel, yieldably mounted shoe sections disposed beneath said toothed wheel, a stationary shoe disposed beneath said toothed disks, said stationary shoe being provided with grooved portions substantially concentric with the peripheries of said disks and in register therewith and a straight rim portion adjacent to the inner grooved portion, and a guide disposed adjacent to said straight rim portion, whereby the leaf being treated, as it is drawn over these shoes, is shifted in its position before being acted upon by the second cleaning wheel.

13. In a fiber cleaning machine the combination of carrier means, a cleaning wheel adjacent to said carrier means, said cleaning wheel being so formed as to provide a plurality of transverse slots in its periphery, a plurality of knives disposed in said slots, knife adjusting means, wedge shaped clamping means engageable with said knives and a reversible scraper plate having its upper surface concentric with the path of travel of said knives, whereby said scraper plate may be reversed in position.

14. In a fiber cleaning machine the combination of movable carrier means, cleaning means adjacent to said carrier means, feed rollers disposed forward of said carrier means and yieldable bearings for said rollers each comprising bearing slides vertically movable, a bearing block pivotally carried in said slides, a cap disposed above said bearing block, and spring tension means disposed between said cap and said bearing block, whereby one of said feed rollers may assume a slight angular position with a horizontal line without binding in said bearings.

In testimony whereof I have hereunto set my hand in the presence of two subscribing witnesses.

ANGEL PONS.

Witnesses:
J. CERVERA CASARES,
ANTO RAMIREZ CARRILLA.

Copies of this patent may be obtained for five cents each, by addressing the "Commissioner of Patents, Washington, D. C."